(12) United States Patent
Paul

(10) Patent No.: US 9,456,694 B2
(45) Date of Patent: Oct. 4, 2016

(54) SEAT SUPPORT ASSEMBLY

(71) Applicant: Muddie's Holdings Pty Ltd, Gargett (AU)

(72) Inventor: Douglas Barrington Paul, Gargett (AU)

(73) Assignee: Muddie's Holdings Pty Ltd, Gargett (AU)

( * ) Notice: Subject to any disclaimer, the term of this patent is extended or adjusted under 35 U.S.C. 154(b) by 67 days.

(21) Appl. No.: 14/089,689

(22) Filed: Nov. 25, 2013

(65) Prior Publication Data

US 2014/0217657 A1 Aug. 7, 2014

(30) Foreign Application Priority Data

Feb. 7, 2013 (AU) ................ 2013200661

(51) Int. Cl.
*B60N 2/50* (2006.01)
*A47C 7/00* (2006.01)
*B60N 2/54* (2006.01)
*B63B 29/06* (2006.01)

(52) U.S. Cl.
CPC ............... *A47C 7/004* (2013.01); *B60N 2/544* (2013.01); *B63B 29/06* (2013.01)

(58) Field of Classification Search
CPC ...... B60N 2/502; B60N 2/544; B60N 2/522; B60N 2/525; B60N 2/509; F16F 7/09; F16F 9/362; F16F 9/363; F16F 9/3228; F16F 9/3214; F16F 9/34; F16F 9/0218; F16F 9/0227; F16F 9/0236; F16F 9/368; F16F 13/002; F16J 1/10; F16J 1/12

USPC .......................................... 267/64.13; 92/172
See application file for complete search history.

(56) References Cited

U.S. PATENT DOCUMENTS

| | | | | |
|---|---|---|---|---|
| 1,097,632 A | * | 5/1914 | Holmes | 92/135 |
| 1,429,249 A | * | 9/1922 | Parker | 248/600 |
| 2,828,960 A | * | 4/1958 | Rene Lucien et al. | 267/64.15 |
| 3,232,597 A | * | 2/1966 | Gaydecki | F16F 3/0873 188/129 |
| 4,697,773 A | * | 10/1987 | Jaumann et al. | 248/162.1 |
| 5,197,718 A | * | 3/1993 | Wallis | 267/119 |
| 7,076,834 B2 | * | 7/2006 | Li | E05F 5/02 16/85 |
| 2009/0094789 A1 | * | 4/2009 | Bereznai | 16/84 |

FOREIGN PATENT DOCUMENTS

AU 2008202395 B1 * 1/2009

\* cited by examiner

*Primary Examiner* — Anna Momper
*Assistant Examiner* — Stephen Bowes
(74) *Attorney, Agent, or Firm* — Thomas A. Runk; Fulwider Patton LLP

(57) ABSTRACT

A seat support assembly including a substantially tubular containing jacket having a first end with an inwardly oriented return lip and a second end closable with a sealing closure, a guide portion adapted to be at least partially received by a seat stand, a resilient separator abutting a portion of the guide portion and the sealing closure, an adapter to attach to the guide portion and at least abut an inner surface of the containing jacket wherein the assembly damps oscillation between the adapter and the containing jacket.

19 Claims, 10 Drawing Sheets

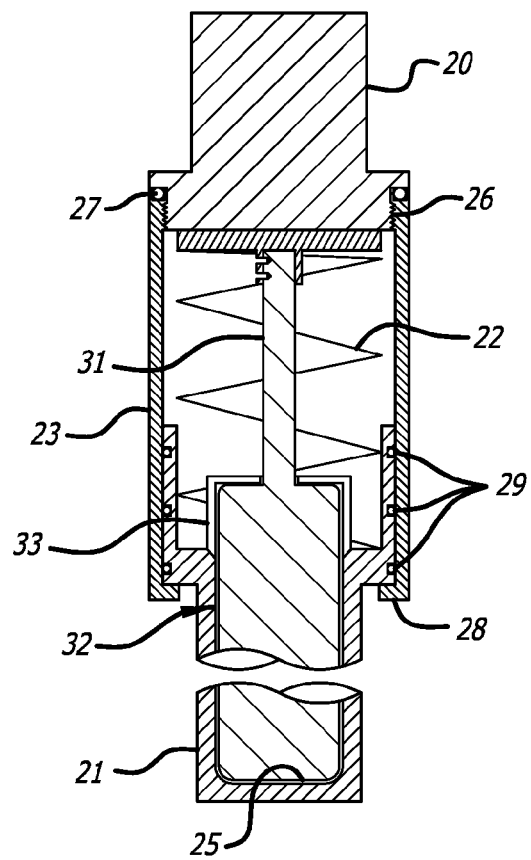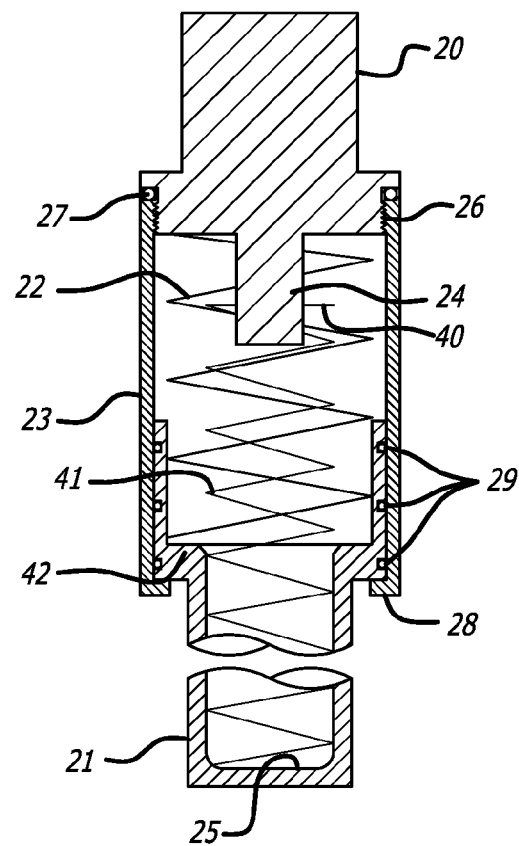

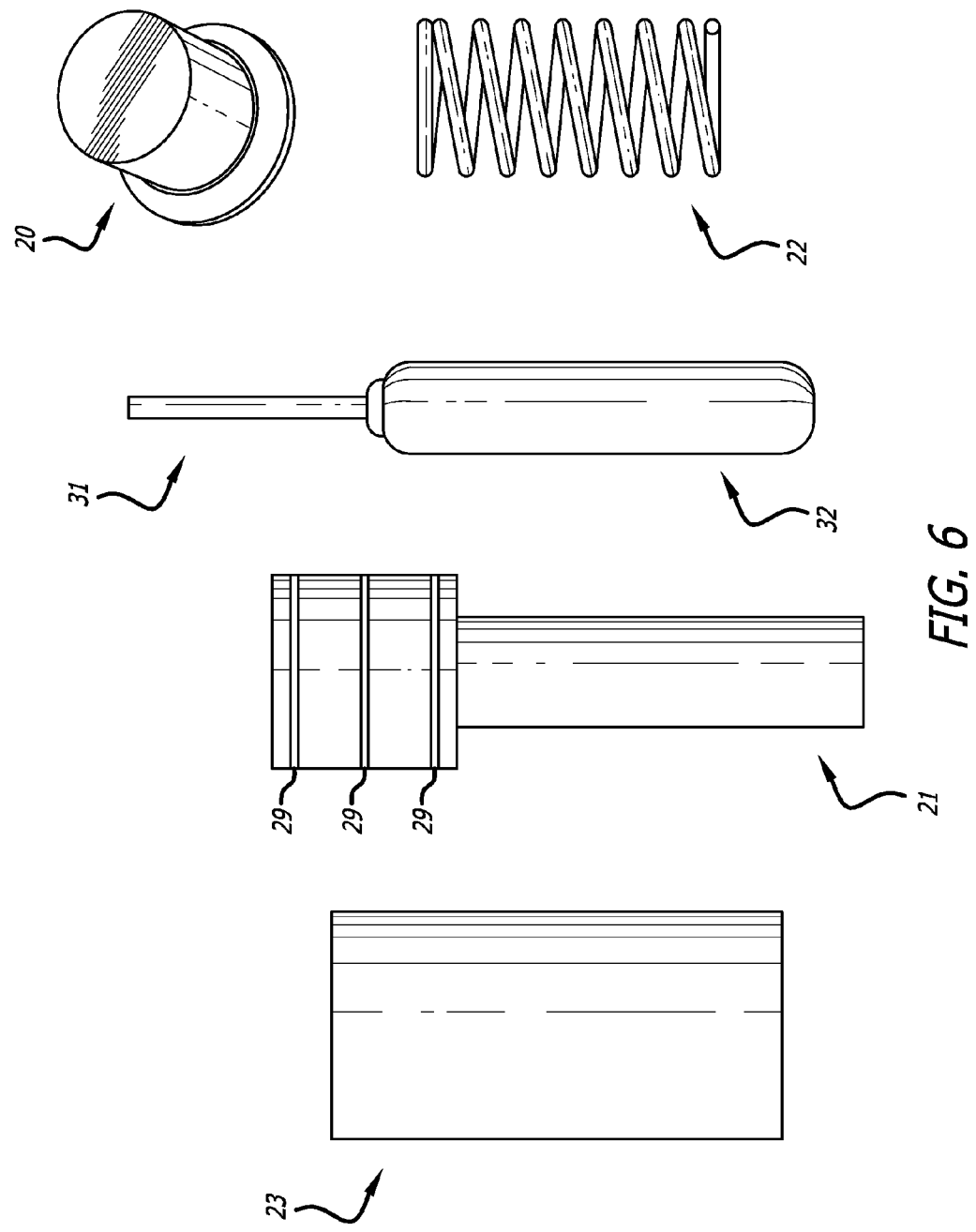

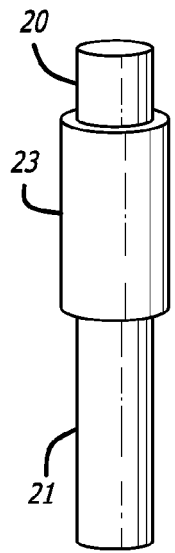
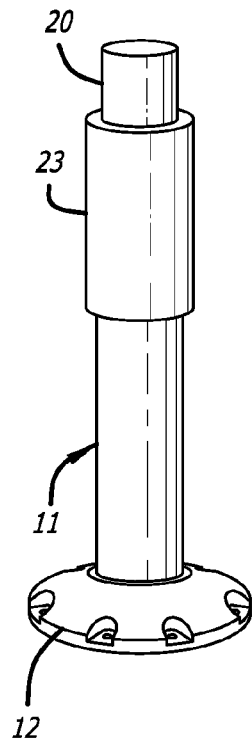
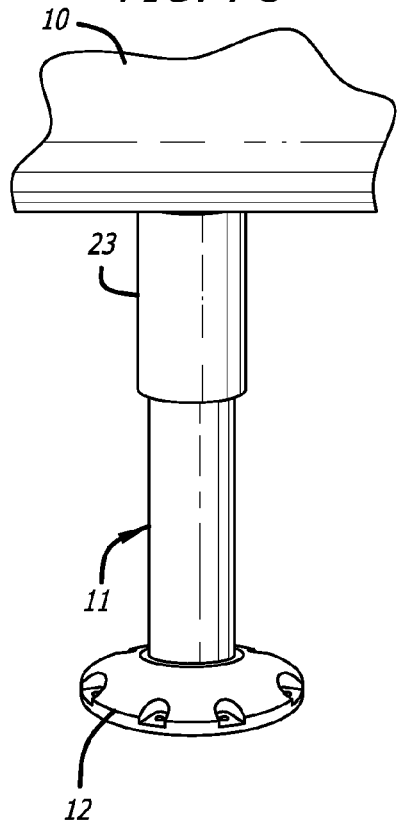
FIG. 7A  FIG. 7B  FIG. 7C
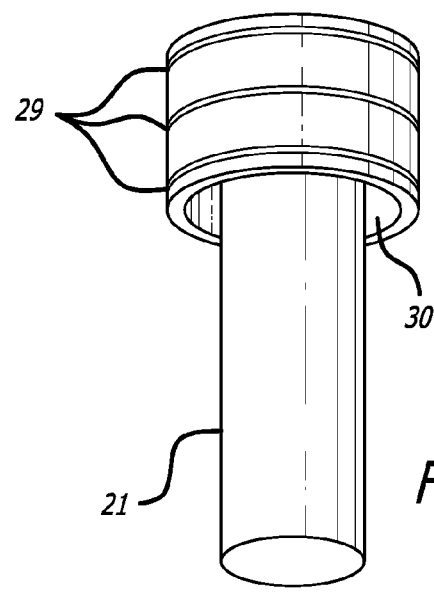
FIG. 8

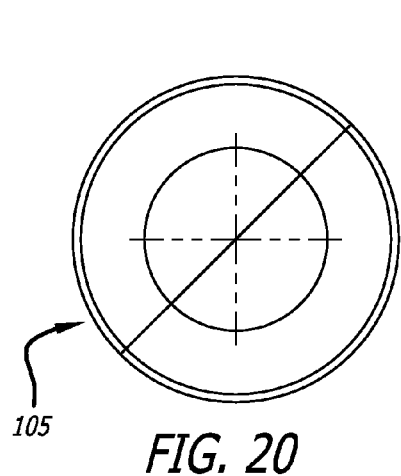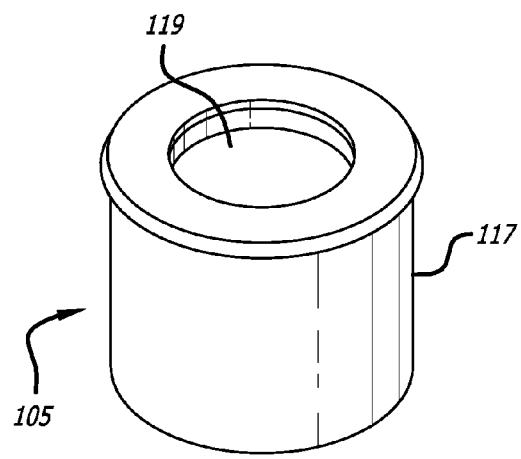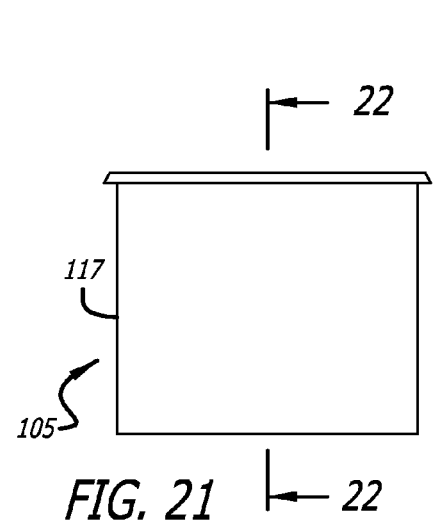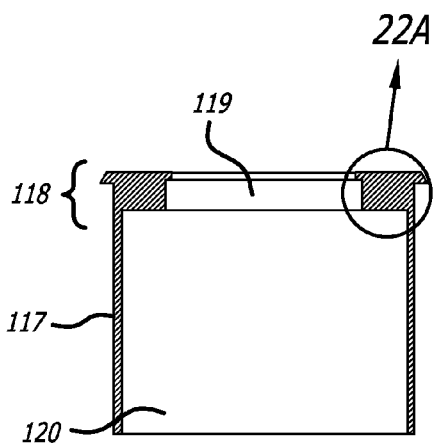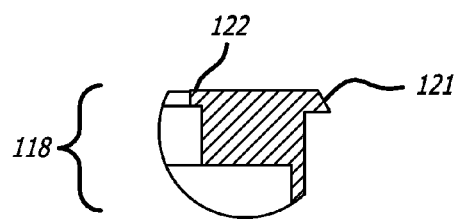

SEAT SUPPORT ASSEMBLY

CROSS-REFERENCES TO RELATED APPLICATIONS

I hereby claim priority benefits under 35 U.S.C. §119 of Australia Patent Application No. 2013200661, filed Feb. 7, 2013, hereby incorporated by reference.

FIELD OF THE INVENTION

The present invention generally relates to shock absorbing seat assemblies, and more particularly to a shock absorbing seat support assembly that can be adapted and/or fitted between a typical pole or tube mounting for a seat, and the seat.

BACKGROUND

Seats in moving vehicles are generally rigidly affixed to a portion of the vehicle so that when a vehicle goes over an uneven surface vibrations and shocks (depending on the nature of the surface) are transferred from the portion of the vehicle that the seat is affixed to, to the seat, and subsequently to a person if someone is sitting in the seat.

Where the vehicle is a boat, the surface is often very uneven and bumpy. Furthermore, boats do not have suspension and shock absorber systems between the vehicle and the surface (the boat and the water respectively) such as in cars. Therefore, the vibrations and shocks of the boat as it goes over waves are typically transferred to the seat in full.

Some seat suspension systems are known for boat seats, but the suspension assembly is often on the outside (e.g. an external spring around the seat support). Unfortunately such assemblies are prone to wear and corrosion as the spring is exposed to the elements. Furthermore, there is a danger of other objections being caught by the spring either damaging the object, the spring, or both.

Another disadvantage of such systems is that usually the suspension assembly is either an integral part of the seat of the support. This means that to upgrade or exchange an existing seat/support system, one of the two needs to be replaced and, in some cases, both need to be replaced due to incompatible fittings. Moreover, once the assembly is installed it is not easy to remove the assembly and therefore the assembly is not easily portable between different boats and/or seats.

It is an aim of this invention to provide an improved boat seat support which overcomes or ameliorates one or more of the disadvantages or problems described above, or which at least provides a useful alternative.

SUMMARY OF THE INVENTION

According to an aspect of the invention, there is provided a seat support assembly for seats, the assembly comprising: a head portion adapted to engage with a portion of a seat, a base portion adapted to engage with a seat stand, a resilient separator located between the head portion and the base portion, and a containing jacket associated with the head and base portions and enclosing the resilient separator; wherein the containing jacket is attached to one of the head portion and the base portion and is slideably moveable relative to the other of the head portion and base portion.

Typically, the seat stand is substantially tubular. For example, the seat stand is usually an elongate tube or pipe with an outwardly extending rim on one end that can be affixed to a surface of a boat, such as the deck.

Preferably, the resilient separator is a spring.

Preferably, the head or base portion that is slideably moveable relative to the jacket slides along an inner surface of the jacket.

The seat support assembly preferably further comprises a sealing ring between the jacket and the head portion or the base portion that the jacket is slideably moveable relative to. Even more preferably, the jacket is sealed with at least one sealing ring between both the head portion and the base portion. Preferably, the volume defined by the head portion, the base portion, and the jacket is substantially airtight.

Preferably, the sealing rings have the effect of sealing the jacket with respect to the head portion and the base portion to not only create an airtight volume of air inside the jacket, but also to keep the resilient separator clean and protected from the outside environment. To ensure an adequate seal between the jacket and the head portion or base portion that the jacket is slideably movable relative to, there is preferably provided at least three sealing rings between that jacket and the respective head portion or base portion.

The jacket may further comprise a lip that limits the slideable movement in at least one direction. The lip is preferably adjacent the inner surface of the jacket that is slideably movable relative to the head portion or base portion, and preferably prevents the jacket and the respective head portion or base portion from sliding past one other and separating.

The seat support assembly may further comprise at least one damper. The damper is preferably effected by the compression of air in the volume defined by the head portion, the base portion, and the jacket. Alternatively, the damper may be in communication with the resilient separator, and/or may be a shock absorber.

Preferably, the resilient separator operates in an axis that is substantially perpendicular to the seat. Typically, this axis will also be substantially similar to the longitudinal axis of the seat stand.

The jacket may be a portion of the head portion or the base portion that it is attached to. Alternatively, the jacket may be attached to the head portion or base portion by some affixing means. Preferably, the jacket is attached to the head portion or the base portion by corresponding screw portions. However, other methods of attaching the two may also be used such as welding, gluing, fitting, moulding, etc.

According to a preferred embodiment of the invention, the jacket is attached to the head portion by corresponding screw portions on the jacket and the head portion, and the jacket is slideably moveable relative to the base portion.

Preferably, the base portion has at least one recessed channel for receiving the seat stand. The Channel allows clearance between the base and the boat seat stand, allowing clearance for different size boat seat stands. The seat support assembly may further comprise at least one liner (or adapter, or sleeve) to allow the head portion and/or the base portion to be adapted to fit different sized or shaped seats and/or seat stands respectively. Preferably, there are two liners, and the at least one or two liners further comprise a grub screw to fasten the liner(s) to the head portion, base portion, seat, or seat stand, as necessary. Even more preferably, the grub screw has a head with an appropriate sized Allen or hex socket.

Preferably, the seat is a boat seat, and the seat support is a boat seat stand. Even more preferably, the seat and the seat stand are of a standard construction as will be known in the industry, and that the support assembly is not permanently engaged with either the seat or the seat stand so that it can be removed easily. In this regard, the support assembly may be temporarily used between a standard seat and seat stand when desired, and then moved to another seat and seat stand, or removed altogether if desired.

According to another aspect of the invention, there is provided a seat support assembly for boat seats, comprising: a head portion adapted to engage with a portion of a seat, wherein said head portion is in communication with a base portion through a resilient separator, and said base portion receives a seat stand, wherein the portion of the seat and the seat stand can also directly engage with each other when not engaged with the head portion and base portion; and a jacket at least partially enclosing said resilient separator attached to one of said head portion or base portion, and slideably moveable along a surface of the jacket relative to the head portion or base portion that the jacket is not attached to.

According to still another aspect of the invention, there is provided a seat support assembly including a substantially tubular containing jacket having a first end with an inwardly oriented return lip and a second end closable with a sealing closure, a guide portion adapted to be at least partially received by a seat stand, a resilient separator abutting a portion of the guide portion and the sealing closure, an adapter to attach to the guide portion and at least abut an inner surface of the containing jacket wherein the assembly damps oscillation between the adapter and the containing jacket.

According to still a further aspect of the invention, there is provided a seat support assembly including a substantially tubular containing jacket having a first end with an inwardly oriented return lip and a second end closable with a sealing closure, a piston received at least partially within the containing jacket and having an engagement portion adapted to engage with a seat stand and a head to at least abut an inner surface of the containing jacket to guide movement of the piston relative to the containing jacket, a resilient separator abutting a portion of each of the piston and the containing jacket wherein the assembly damps oscillation between the piston and the containing jacket.

According to yet another aspect of the invention, there is provided a seat support assembly including a substantially tubular containing jacket having a first end with an inwardly oriented return lip and a second end closable with a sealing closure, a base portion adapted to engage with a seat stand, a resilient separator abutting a portion of the base portion and the sealing closure, a slide cylinder to abut at least one interior wall of containing jacket and slide therein and an adapter to attach to the base portion and at least abut the slide cylinder wherein the assembly damps oscillation between the base and the containing jacket.

The containing jacket is preferably generally cylindrical. Typically, the generally cylindrical containing jacket has a pair of open ends.

Preferably, one end of the generally cylindrical containing jacket has a return lip, extending radially inwardly towards the centre of the jacket. Typically, the return lip extends only part way towards the centre of the jacket leaving an opening defined between the different portions of the return lip.

Preferably, the other end of the generally cylindrical containing jacket includes at least a portion of a fastening or attachment mechanism in order to engage with the sealing closure. The fastening or attachment mechanism is typically a threaded attachment mechanism and the portion provided on the generally cylindrical containing jacket is preferably an internally threaded portion.

The containing jacket may be of any length and is preferably unitary. Further, the containing jacket is typically manufactured of a metal for robustness.

The sealing closure of the present invention typically corresponds in shape to the end of the containing jacket to which it is attached. Preferably, the sealing closure will be circular. The sealing closure is typically provided with at least a portion of a fastening or attachment mechanism in order to engage with the containing jacket. Preferably, the sealing closure will be provided with an externally threaded portion.

The sealing closure of a preferred embodiment preferably has a substantially planar cap portion and a cylindrical depending skirt extending from one side of the planar cap portion. Normally, the external thread is provided on the depending skirt.

The cap portion is preferably of larger diameter than the depending skirt forming a circumferential annular overlap portion in order to close the end of the containing jacket and be flush with the external cylindrical surface of the containing jacket.

Again, it is preferred that the sealing closure is manufactured from metal. One or more sealing members may be provided in association with the sealing closure. Normally, the sealing members will be O-rings or similar. Preferably, a sealing member is provided adjacent the cap portion. Preferably, a circumferential depression or recess is provided adjacent the cap portion in order to provide a seat for the sealing member.

The apparatus of the invention includes a guide portion to be at least partially received by a seat stand. Typically, the guide portion is provided for the resilient separator. According to a preferred embodiment, the guide portion is cylindrical and hollow, defining a cylindrical cavity within. Preferably, one of the ends of the guide portion is a closed end and the other is an open end.

The closed end preferably provides an abutment surface for one end of the resilient separator. The cylindrical guide portion is preferably sized to closely receive the resilient separator within the cylindrical cavity and the resilient separator may abut the internal walls of the cylindrical guide portion.

The end of the guide portion opposite the closed end is preferably an open end. The open end of the guide portion typically has an annular end surface. The annular end surface may be provided with a location seat.

Preferably, the location seat is or includes a rebate provided circumferentially. Preferably, the location seat is provided into an external cylindrical surface of the guide portion. Typically, the location seat is provided at a constant depth over its height.

There will typically be a second, deeper rebate formed in the location seat adjacent the end surface of the guide portion. This deeper rebate is preferably used as a seat for a weld or other attachment mechanism to attach the guide portion to the adapter or piston head and/or to provide a seat for the adapter or piston head. Preferably, this deeper rebate is provided with the first angular portion, angled inwardly towards the centre of the guide portion.

A land or flattened circumferential portion is provided outside the angled portion, to the location seat. The land will typically be substantially perpendicular to the longitudinal direction of the guide cylinder.

Preferably, the side wall and end wall of the guide cylinder are of greater thickness than the containing jacket.

The guide cylinder is typically received within and partially extends out of the containing jacket through the opening defined by the return lip.

The guide cylinder is preferably maintained in location within the jacket by the adapter/piston. The guide cylinder is typically not fixed in position within the containing jacket. In particular, the guide cylinder typically slides within the containing jacket with the piston such that separation between the closed end of the guide cylinder and the sealing closure of the containing jacket changes depending upon the amount of load placed on the apparatus.

The closed end of the guide cylinder typically sits within the seat stand which is normally tubular. An end edge of the seat stand will preferably be at least partially received between the guide cylinder and the return lip of the containing jacket and abut the piston head.

The apparatus of the present invention includes a resilient separator abutting a portion of the guide portion and the sealing closure of the containing jacket. The resilient separator of the present invention is generally a spring or coil. The resilient separator typically biases the jacket and the guide portion into an extended condition.

The resilient separator is typically located within the apparatus to abut the sealing closure at one end and the closed end of the guide portion at the other end.

Locating means may be provided on the sealing closure to prevent lateral movement of the resilient separator. The locating means is typically a raised wall or protrusion which is shaped to be at least partially received within or about an end of the preferred resilient separator.

The apparatus of the present invention also includes an adapter to attach the guide portion and at least abut an inner surface of the containing jacket. Typically, the adapter will have a multipart construction, one part which forms the piston head and is attached to the guide portion and a second part which is an outer sleeve positioned against an internal surface of the containing jacket and relative to which the piston head preferably slides.

Preferably, the outer sleeve is generally cylindrical and abuts an inner surface of the containing jacket. The outer sleeve may move within the containing jacket but preferably, remains in place relative to the containing jacket once the apparatus is assembled and the piston head reciprocates relative to the outer sleeve.

The outer sleeve is preferably manufactured of a low friction material. One particularly preferred material is a high performance, high temperature polyamide material. Examples of this material include Nylon®, Ertalon® and Stanyl®. Alternatively, an internal surface of the outer sleeve can be formed of this material only, that is one or more linings layers or liners may be provided.

Typically, the outer sleeve is sealed relative to the inner surface of the containing jacket. Typically, one or more sealing members are provided in order to seal the outer sleeve relative to the inner surface of the containing jacket. Normally, the sealing members are O-rings or similar. A preferred embodiment of the outer sleeve includes one or more circumferential depressions or recesses provided in the outer surface of the outer sleeve to properly seat the sealing members and limit the movement of the sealing members when force is applied to the piston, a portion of which could be transferred to the outer sleeve through friction. Preferably, at least one sealing member is provided and more preferred is that two or more are provided with appropriate seats for each.

Preferably, the outer sleeve is generally cylindrical and is open at both ends. According to a preferred embodiment, the outer sleeve is approximately half the length of the containing jacket.

The piston head portion of the adapter of the apparatus of the present invention has a generally cylindrical body with an enlarged, radially extending annular head portion. Preferably, the cylindrical body is hollow. An opening is typically provided in the head portion which is smaller than an opening extending through the body portion of the piston head portion.

Normally, the head portion of the piston head portion is thickened in order to bear the loads which are applied thereto.

The head portion preferably includes a radially, outwardly extending flange at a forward end of the head portion. Typically, an outer edge of the flange is angled rearwardly. In this context, the terms "forward" and "rearward" are defined relative to be longitudinal axis of the apparatus with "forward" being towards the head end (open end) of the guide portion and "rearward" being towards the closed end of the guide portion.

The head portion also includes a radially inwardly extending flange at the forward end of the head portion. Therefore, the cylindrical body of the piston head portion of the preferred embodiment has a flange extending radially outward and a second flange extending radially inwardly.

The radially inwardly extending flange preferably abuts the land portion provided on the guide portion and a weld or similar is normally formed between the two, and the angled portion provided on the guide portion. The particular shapes involved provide a region adapted to seat a weld particularly well.

The radially inwardly extending flange also defines an opening through which the resilient separator extends in use.

The piston head portion is located radially within the outer sleeve with the outwardly extending flange at the forward end of the piston head abutting the end edge of the outer sleeve to prevent movement of the piston head portion further towards the rear of the containing jacket.

In assembly of the apparatus of the present invention, the guide portion is typically press-fitted and fixed to the piston head, normally through welding. The outer sleeve is then placed over the body of the piston head and the three components inserted into the jacket. The resilient separator or spring is then generally inserted into the guide portion and whilst the resilient separator is being depressed, the sealing closure is attached to the containing jacket thereby biasing the guide portion in the containing jacket apart to their maximum effective length.

In order that the invention may be more readily understood and put into practice, one or more embodiments thereof will now be described, by way of example only, with reference to the accompanying drawings.

BRIEF DESCRIPTION OF THE DRAWINGS

FIG. 3 illustrates a longitudinal cross sectional view of another embodiment of the seat support assembly.

FIG. 4 illustrates a longitudinal cross sectional view of another embodiment of the seat support assembly.

FIG. 6 illustrates a side perspective view of the separate parts of the seat support assembly embodiment shown in FIG. 3.

FIG. 7a illustrates a side perspective view of the assembled seat support assembly parts shown in FIG. 6.

FIG. 7b illustrates a side perspective view of the assembled seat support assembly parts shown in FIG. 6 engaged with a seat stand.

FIG. 7c illustrates a side perspective view of the assembled seat support assembly parts shown in FIG. 6 engaged with a seat stand and a seat.

FIG. 8 illustrates a side perspective view of the separate parts of the base of the seat support assembly as shown in FIG. 2.

FIG. 19 is an isometric view of a piston head portion as illustrated in FIG. 10.

FIG. 20 is a tope view of the piston head portion illustrated in FIG. 19.

FIG. 21 is a side view of the piston head portion illustrated in FIG. 19.

FIG. 22 is a sectional side view of the piston head portion illustrated in FIG. 21 along line A-A.

FIG. 22A is a detail view of the portion indicated B in FIG. 22.

DETAILED DESCRIPTION OF THE PREFERRED EMBODIMENTS

Figure 1:
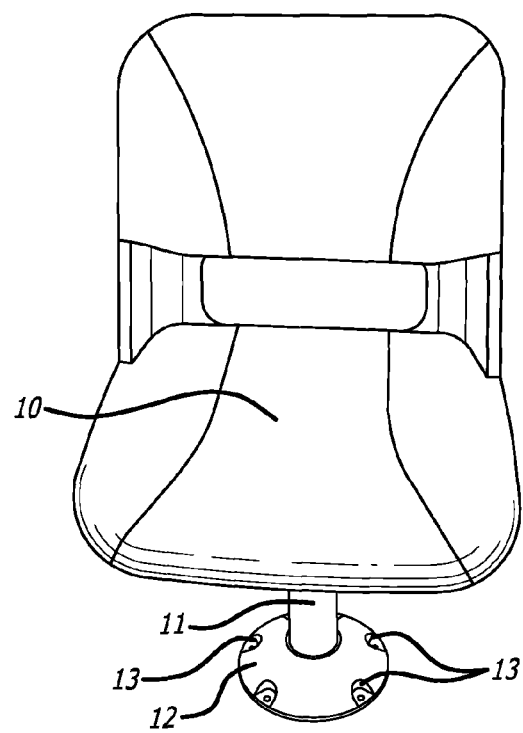
FIG. 1 illustrates a standard boat seat on a standard seat stand (prior art).

FIG. 1 illustrates a boat seat 10 and seat stand 11 typical of those known in the prior art. The seat stand 11 is an elongate tube (partially obstructed by the seat in FIG. 1) with an outwardly extending rim 12 on one end that is affixed adjacent a surface of a boat (not shown) such as a boat deck. The seat stand 11 is usually affixed using screws or bolts through holes 13 in the rim 12. The seat 10 is usually a separate part to the stand 11, and has a portion for receiving the stand 11 (obstructed by the seat). A seat support assembly according to an embodiment of the present invention may be placed between the seat 10 and the seat stand 11 to provide a shock and vibration dampening means between the boat and the seat 10.

Figure 2:
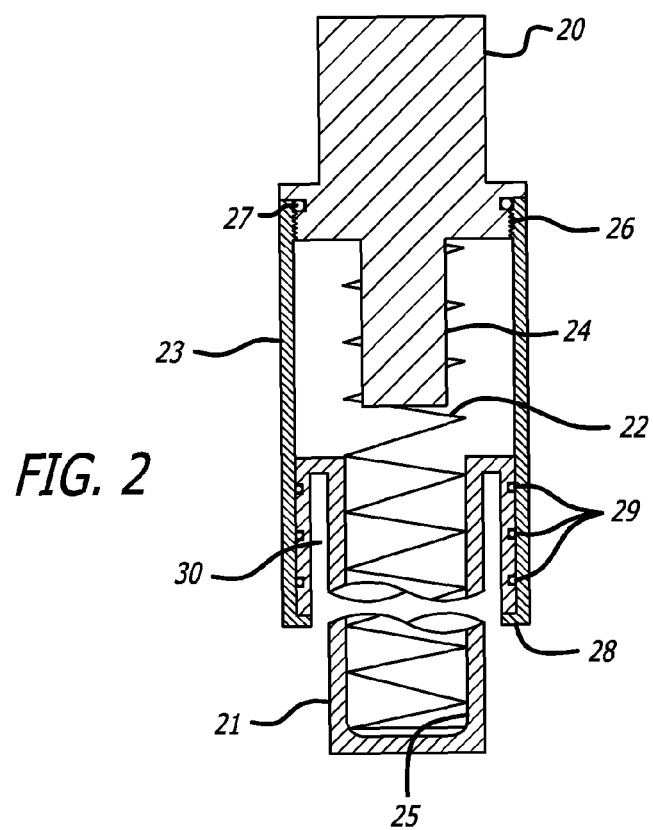
FIG. 2 illustrates a longitudinal cross sectional view of an embodiment of the seat support assembly.

FIG. 2 illustrates an embodiment of the seat support assembly having a head portion 20 adapted to engage with a portion of a seat that would otherwise engage a seat stand, and a base portion 21 adapted to receive a seat stand that would otherwise engage a seat (e.g. the seat support assembly goes between the seat 10 and seat stand 11 that could otherwise be directly engaged with each other if they were not engaged with the head portion 20 and the base portion 21).

The head portion 20 is indirectly connected to the base portion 21 through a resilient separator, namely an elongate coil spring 22. The base 21 according to this embodiment can be seen by itself in a side perspective view in FIG. 8. One end of the spring 22 is in engagement with the head portion 20, and the other in engagement with the base portion 21, such that they are in communication with each other via the spring 22. A jacket 23 is provided that keeps engages with the head portion 20 and the base portion 21. The jacket 23 keeps the head portion 20 and the base portion 21 aligned with each other so that the spring 22 is only stressed in the longitudinal direction and, furthermore, keeps concealed the head portion of the base portion 21, the bottom of the head portion 20, and the portion of the spring 22 between the head portion 20 and base portion 21 that would otherwise be exposed. The covering of the spring 22 by the jacket 23 also has the advantageous effect that the spring 22 cannot undesirably catch or trap articles between the coils. Although the jacket 23 is shown as a separate piece in the figures, it will be appreciated that the jacket could also be formed as part of the head portion or the base portion, and no limitation is meant thereby.

The head portion 20 has a protrusion 24 that the spring can coil around to keep it aligned and engaged with the head portion 20. Correspondingly, the base portion 21 has a recess 25 that the spring 22 fits within to keep the spring 22 aligned and engaged with the base portion 21.

The jacket 23 is fixedly attached to the head portion 20 by corresponding screw portions 26 between the two pieces. An O-ring 27 is also provided to ensure a tight seal is achieved between the head portion 20 and the jacket 23. At the other end, the jacket 23 is not fixedly attached to the base portion 21, but held adjacent the base portion 21 such that the two pieces are slideably moveable with respect to each other. For example, in FIG. 2, the base portion 21 can move upwards relative to the jacket 23 by applying a force which in turn compresses the spring 22 and the base portion 21 slides along the inner surface of the jacket. When the force is removed, or overcome by the reactive force of the spring, the extension of the spring slides the base portion 21 back down the inner surface of the jacket 23 to its starting position. To prevent the base portion 21 from sliding out of the jacket 23, the jacket 23 has a lip 28 that engages with at least a portion of the base portion 21.

Three sealing rings 29 are evenly spaced on the outermost surface of the base portion 21 that slides against the jacket 23 to provide an air seal between the base portion 21 and the jacket 23. Together with the sealing ring seal 27 between the head portion 20 and the jacket 23, a substantially airtight volume of air is defined by the head portion 20, base portion 21, and jacket 23. The sealing ring has the advantageous effect of keeping the spring 22 and internal surfaces clean and free of debris. Furthermore, the seals prevent corrosion of the spring 22 or other internal parts/surfaces due to keeping corrosive elements such as water and salt spray out of the interior.

The base portion 21 has a channel 30 that receives the tubular shaped seat stand 11. Generally, channel 30 allows clearance between the base and the boat seat stand 11, allowing clearance for different size boat seat stands, as the seat support assembly is intended to be transferrable. In use, the seat support is placed in between a seat 10 and a seat stand 11 on a boat. As the boat traverses rough water, the shocks and vibrations of the boat are transferred to the seat stand 11 and subsequently to the base portion 21. The base portion 21 then transfers the shocks and vibrations to the spring 22, which compresses longitudinally, substantially reducing the shocks and vibrations in that axis. The remaining reduced shocks and vibrations are then transferred to the head portion 20 and subsequently to the person sitting in the seat 10. To reduce oscillations occurring in the spring, and to absorb some of the force of the shock, the airtight volume defined by the head portion 20, base portion 21, and jacket 23 acts as a damper. The end result is that the seat support absorbs and dissipates a substantial portion of the shocks and vibrations transferred from the boat resulting in a smoother, more comfortable ride for a person sitting in the seat.

FIG. 3 illustrates an alternative embodiment of the seat support. The head portion 20 in this embodiment does not have the protrusion 24 shown in FIG. 2, and is instead connected to a rod 31 of a hydraulic shock absorber 32. The other end of the shock absorber 32 is held in place in the recess 25 of the base portion 21 by a retainer 33. The shock absorber 32 is therefore engaged between the head portion 20 and the base portion 21, and absorbs/dampens shocks and vibrations between the two parts.

The spring 22 has a slightly larger radius in this embodiment, to allow it to fit around the retainer 33 of the base portion 21. The base portion 21 is also shaped differently as it does not have the channel 30 shown in FIG. 2. Although the lack of a channel 30 in FIG. 3 makes it easier to accommodate the larger radius spring 22, this embodiment could also have a similar channel 30. In any event, the base portion 21 is adapted to fit securely inside a seat stand 11.

Although in the embodiment illustrated in FIG. 3 there is a shock absorber 32 present to dampen the forces between the head portion 20 and the base portion 21, this does not necessarily replace the air damper effect provided by the airtight volume of air defined by the head portion 20, base portion 21, and jacket 23.

Another embodiment of the seat support is illustrated in FIG. 4. In this embodiment, the head portion 20 has a protrusion 24 similar to that in the first embodiment illustrated in FIG. 2. However, instead of having only a single spring, this embodiment has two springs, 22 and 41. The two springs provide a spring-over-spring mechanism wherein the first spring 22 is a main "riding" spring, and the second spring 41 is a heavier load bearing spring. As illustrated in FIG. 4, the main spring has one end engaged with the inner surface of the head portion 20, and the other end engaged with edge 42 on the base portion 21. The load bearing spring 41 on the other hand has one end engaged with the head portion 20, and the other with the recess 25 of the base portion 21. Again, an air damper effect is provided by the airtight volume of air defined by the head portion 20, base portion 21, and jacket 23.

Although sealing ring 27 is in a slightly different place in FIGS. 3 and 4 (compared to FIG. 2), it still functions in exactly the same manner. Namely, it is between the head portion 20 and the jacket 23, and provides a seal between the two pieces.

Figure 5A:
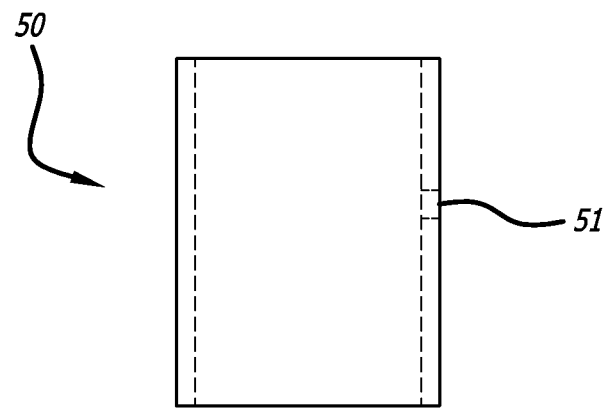
FIG. 5a illustrates a cross section view of a liner that can be affixed to the head portion of the seat support assembly as shown in FIGS. 2 to 4.
Figure 5B:
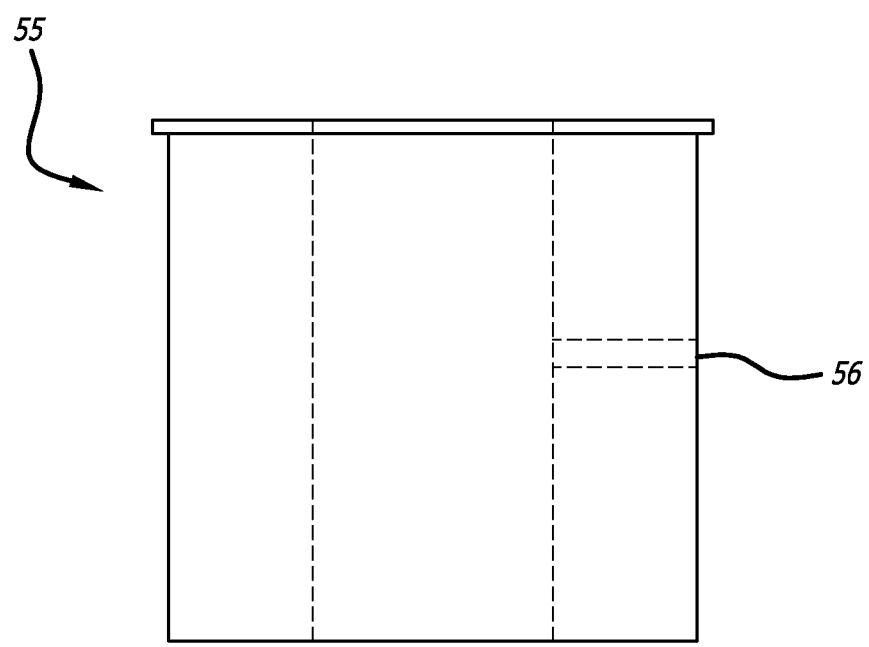
FIG. 5b illustrates a cross section view of a liner that can be affixed to the base portion of the seat support assembly as shown in FIGS. 2 to 4.

FIGS. 5a and 5b illustrate liners (or adapter, or sleeve) to allow the head portion and/or base portion to be adapted to fit different sized or shaped seats and/or seat stands respectively. Particularly, 50 is a liner for the head portion of the seat support, and 55 is a liner for the base portion of the seat support. The head portion and bottom liners also have a threaded hole in the side (51 and 56 respectively) for a grub, or set screw, to be inserted. This allows the liners to be fastened to the head portion 20, base portion 21, seat 10, or seat stand 11 as necessary.

FIG. 6 illustrates the separate parts of the seat support assembly embodiment shown in FIG. 3. FIG. 7a shows the same parts assembled, and ready to use. In FIG. 7b, the seat support is placed onto/into the seat stand 11. Base portion 21 cannot be seen in FIG. 7b because it is inside the seat stand 11. FIG. 7b then shows the seat support installed between the seat stand 11 and the seat 10. All that is visible of the seat support is the jacket 23, because the base portion 21 is inside the seat stand 11, and the head portion 20 is inside a portion of the seat 10.

The seat 10 in FIG. 7c is partially insulated from shocks and vibrations in the seat stand 11 due to the seat support assembly between them. One of the primary advantages of the seat support assembly is that it can be used a permanent or a temporary fitting, being transportable from one boat to another.

In the alternative embodiment illustrated in FIGS. 9 to 22, the seat support assembly 100 including a substantially tubular containing jacket 101 having a first end with an inwardly oriented return lip and a second end closable with a sealing closure 102, a guide cylinder 103 adapted to be at least partially received by a seat stand (not shown), a resilient separator coil spring 104 abutting a portion of the guide portion 103 and the sealing closure 102, and a two part adapter with a piston head 105 to attach to the guide portion 103 and an outer sleeve 106 at least abut an inner surface of the containing jacket 101.

The containing jacket 101 is of the preferred embodiment is generally cylindrical with a pair of open ends. One end of the cylindrical containing jacket 101 has a return lip 107, extending radially inwardly towards the centre of the jacket 101. The return lip 107 extends only part way towards the centre of the jacket 101 leaving an opening 108 defined between the different portions of the return lip 107.

The other end of the containing jacket 101 includes an internally threaded portion.

The sealing closure 102 corresponds in shape to the end of the containing jacket 101 to which it is attached. The illustrated sealing closure is circular and is provided with an externally threaded portion 109 as illustrated best in FIG. 10.

The sealing closure of the preferred embodiment has a substantially planar cap portion and a cylindrical depending skirt extending from one side of the planar cap portion with the external thread 109 provided on the depending skirt.

Figure 14A:
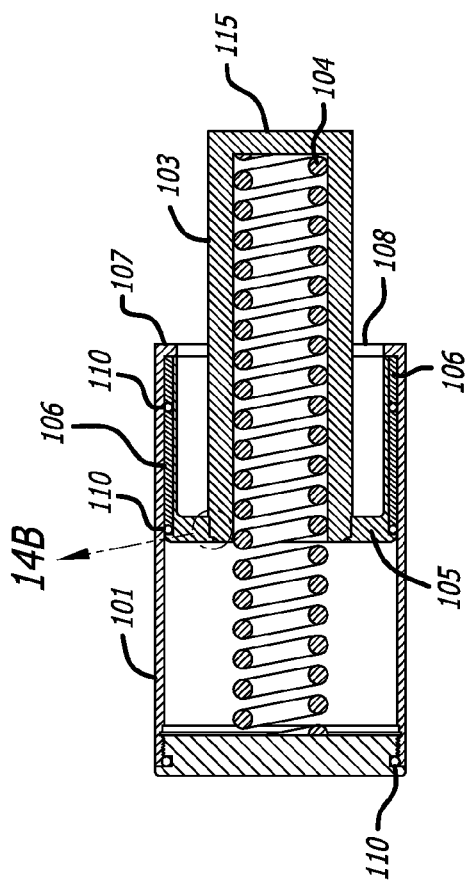
FIG. 14A is a sectional side view of the seat support assembly illustrated in FIG. 15 along line B-B.
Figure 15:
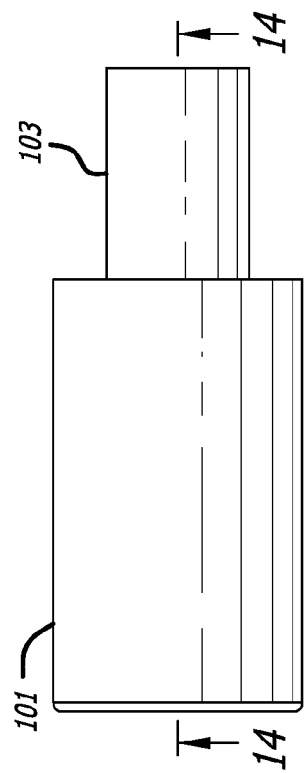
FIG. 15 is a side view of the seat support assembly illustrated in FIG. 10.

The cap portion is of larger diameter than the depending skirt forming a circumferential annular overlap portion in order to close the end of the containing jacket and be flush with the external cylindrical surface of the containing jacket as illustrated in FIG. 14A.

One or more sealing O-rings 110 are provided adjacent the cap portion. A circumferential depression or recess 111 is provided adjacent the cap portion in order to provide a seat for the O-ring.

The guide portion 103 is provided for the resilient separator spring 104 and to be at least partially received by a seat stand. According to the illustrated embodiment, the guide portion 103 is cylindrical and hollow, defining a cylindrical cavity within. One of the ends of the guide portion is a closed end and the other is an open end.

The closed end, closed by a wall 115 provides an abutment surface for one end of the resilient separator spring. The cylindrical guide portion 103 illustrated is sized to closely receive the resilient separator within the cylindrical cavity and the resilient separator spring 104 abuts the internal walls of the cylindrical guide portion.

The end of the guide portion 103 opposite the closed end is an open end. The open end of the guide portion typically has an annular end surface. The annular end surface may be provided with a location seat 112 which is a rebate provided circumferentially into an external cylindrical surface of the guide portion 103 at a constant depth over its height.

Figure 17A:
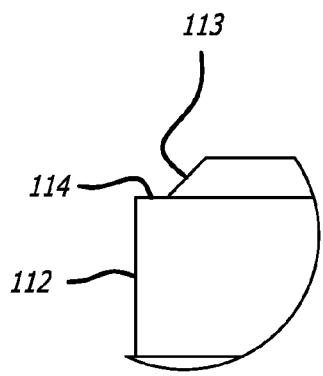
FIG. 17A is a detail view of the portion indicated D from FIG. 17.
Figure 16:
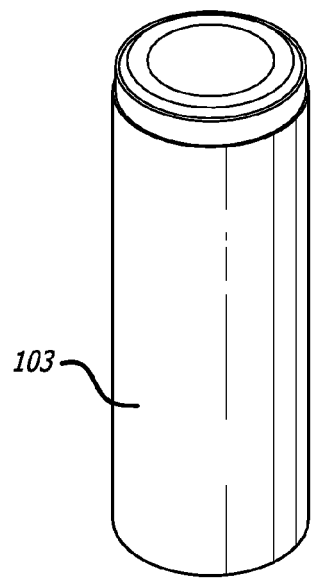
FIG. 16 is an isometric view of the guide cylinder of the seat support assembly illustrated in FIG. 10.
Figure 17:
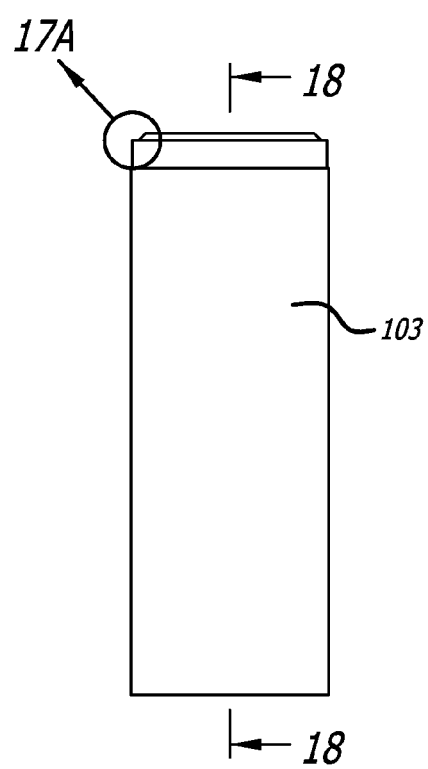
FIG. 17 is a side view of the guide cylinder illustrated in FIG. 16.
Figure 18:
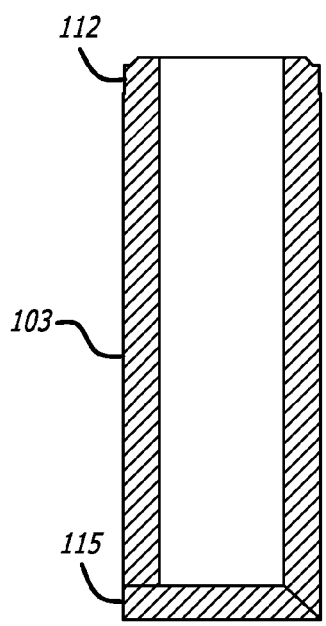
FIG. 18 is a section side view of the guide cylinder illustrated in FIG. 17 along line C-C.

A second, deeper rebate is formed in the location seat adjacent the end surface of the guide portion 103 as illustrated in FIG. 17A. This deeper rebate is used as a seat for a weld or other attachment mechanism to attach the guide portion 103 to the piston head 105 and to provide a seat for the piston head 105. This deeper rebate is provided with a first angled portion 113, angled inwardly towards the centre of the guide portion 103.

A land 114 or flattened circumferential portion is provided outside the angled portion 113, to the location seat 112. The land 114 is substantially perpendicular to the longitudinal direction of the guide cylinder 103.

As illustrated in FIG. 14A the guide cylinder 103 is received within and partially extends out of the containing jacket 101 through the opening 108 defined by the return lip 107.

The closed end of the guide cylinder 103 typically sits within the seat stand which is normally tubular. An end edge of the seat stand will preferably be at least partially received between the guide cylinder 103 and the return lip 107 of the containing jacket 101 and abut the piston head 105.

The resilient separator coil spring 104 abuts the closed lower wall 115 of the guide portion 103 and the sealing closure 102 of the containing jacket 101 to bias the jacket 101 and the guide portion 103 into an extended condition.

As mentioned, the adapter has a multipart construction, a piston head 105 attached to the guide portion 103 and an outer sleeve 106 positioned against an internal surface of the containing jacket 101 and relative to which the piston head 105 slides.

Figure 9:
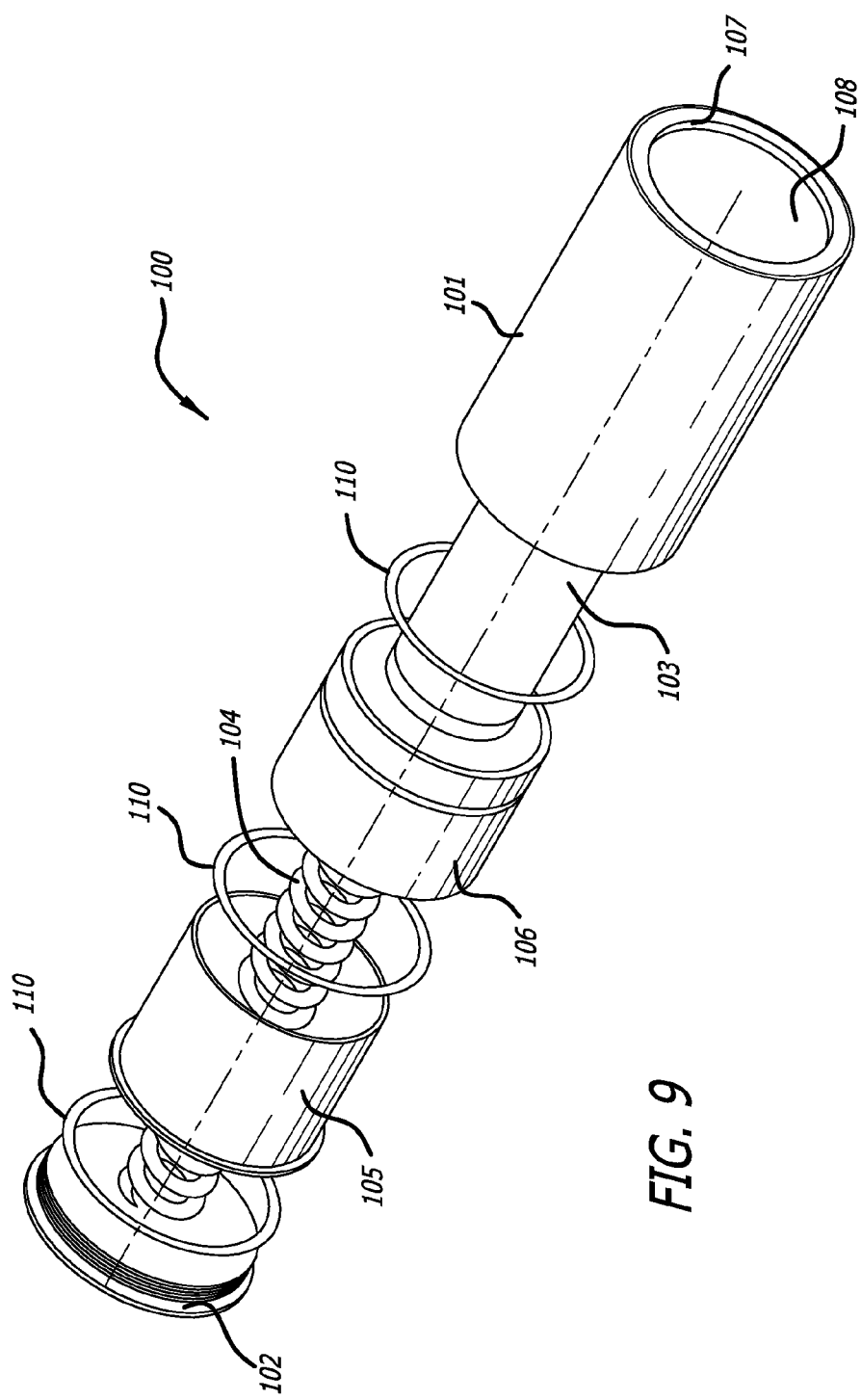
FIG. 9 is an exploded isometric view of a seat support assembly according to a second embodiment of the present invention.
Figure 10:
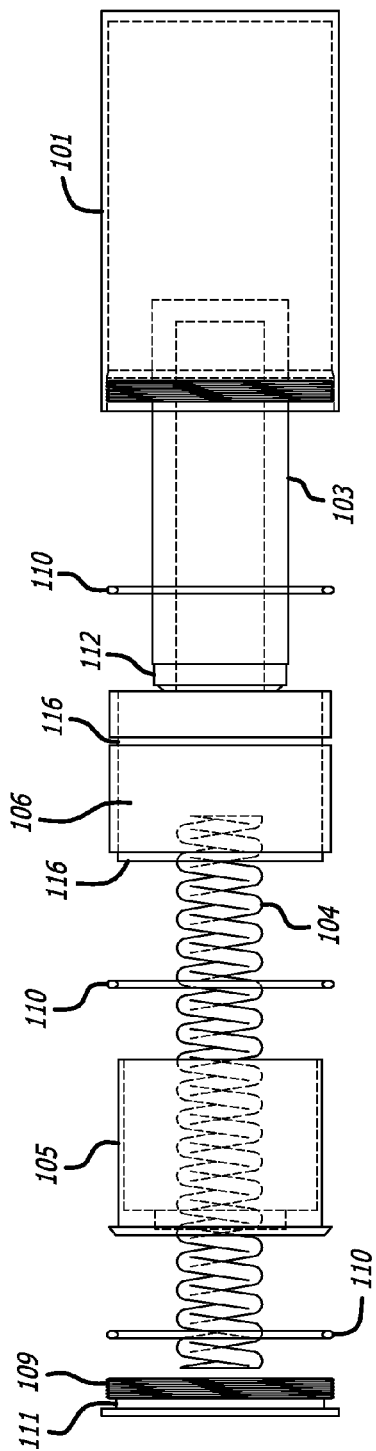
FIG. 10 is an exploded side view of the seat support assembly illustrated in FIG. 9.
Figure 12:
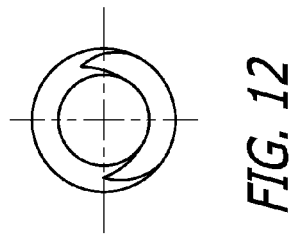
FIG. 12 is an end view of a resilient separator coil spring assembly illustrated in FIG. 11.
Figure 11:
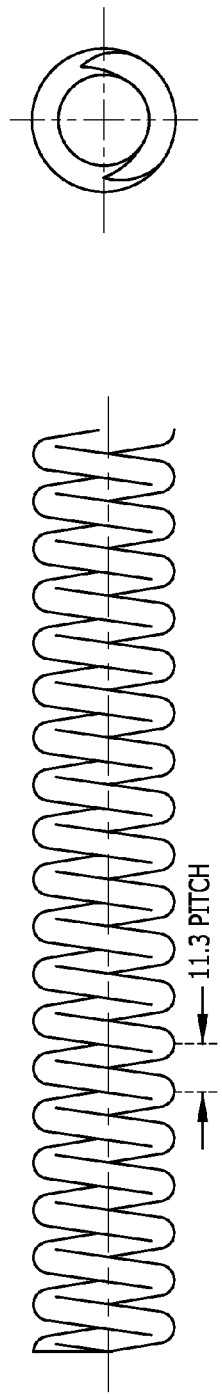
FIG. 11 is a side view of a resilient separator coil spring from the seat support assembly illustrated in FIG. 10.

As illustrated in FIGS. 9 and 10, the outer sleeve 106 is generally cylindrical and abuts an inner surface of the containing jacket 101.

The outer sleeve 106 of the preferred embodiment is manufactured of a low friction material such as Ertalon® or Stanyl®.

The outer sleeve 106 is sealed relative to the inner surface of the containing jacket 101 through provision of one or more sealing O-rings 110. The illustrated embodiment of the outer sleeve 106 includes a pair of circumferential depressions or recesses 116 provided in the outer surface of the outer sleeve 106 to properly seat the O-rings 110 and limit the movement of the O-rings 110 when force is applied to the piston 105, a portion of which could be transferred to the outer sleeve 106 through friction.

The piston head 105 illustrated in FIGS. 19 to 22A has a generally cylindrical, hollow body 117 with an enlarged, radially extending annular head portion 118. An opening 119 is typically provided in the head portion 118 which is smaller than an opening 120 extending through the body portion 117 of the piston head portion 105.

As illustrated in FIGS. 22 and 22A in particular, the head portion 118 of the piston head 105 is thickened in order to bear the loads which are applied thereto.

The head portion 118 includes a radially, outwardly extending flange 121 at a forward end of the head portion 118. As illustrated in FIG. 22A, an outer edge of the flange is angled rearwardly.

The head portion 118 also includes a radially inwardly extending flange 122 at the forward end of the head portion 118. Therefore, the cylindrical body of the piston head 105 of the illustrated embodiment has a flange extending radially outward 121 and a second flange extending radially inwardly 122.

Figure 14B:
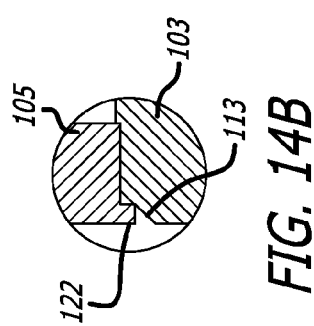
FIG. 14B is a detailed view of the portion C from FIG. 14A.
Figure 13:
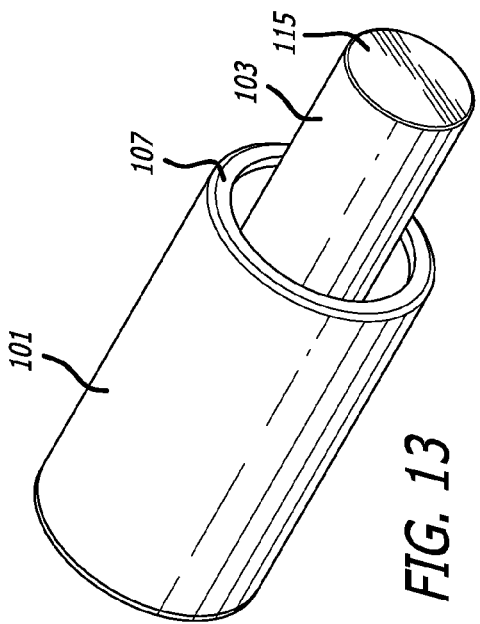
FIG. 13 is an isometric view of the seat support assembly illustrated in FIG. 10.

In the assembled apparatus illustrated in FIG. 14B, it can be seen that the radially inwardly extending flange 122 abuts the land portion 114 (FIG. 17A) provided on the guide portion 103 and a weld or similar is normally formed between the two, and the angled portion 113 provided on the guide portion 103. The particular configuration illustrated in FIG. 14B provides a region adapted to seat a weld particularly well.

The radially inwardly extending flange 122 also defines the opening 119 through which the resilient separator spring 104 extends in use.

The piston head portion 105 is located radially within the outer sleeve 106 with the outwardly extending flange 121 at the forward end of the piston head 105 abutting the end edge of the outer sleeve 106 to prevent movement of the piston head 105 further towards the rear of the containing jacket 101.

It is to be understood that the terminology employed above is for the purpose of description and should not be regarded as limiting.

The foregoing embodiments are intended to be illustrative of the invention, without limiting the scope thereof. The invention is capable of being practised with various modifications and additions as will readily occur to those skilled in the art.

Accordingly, it is to be understood that the scope of the invention is not to be limited to the exact construction and operation described and illustrated, but only by the following claims which are intended, where the applicable law permits, to include all suitable modifications and equivalents within the spirit and concept of the invention.

Throughout this specification, including the claims, where the context permits, the term "comprise" and variants thereof such as "comprises" or "comprising" are to be interpreted as including the stated integer or integers without necessarily excluding any other integers.

I claim:

1. A seat support assembly including:
   a tubular containing jacket having a first end with an inwardly oriented return lip and a second end closable with a sealing closure,
   a tubular guide portion adapted to be at least partially received by a seat stand,
   a resilient separator with an orientation maintained by the guide portion and abutting a portion of the guide portion and the sealing closure, and
   a multipart adapter to attach to the guide portion and at least abut an inner surface of the containing jacket, the adapter including:
   a piston with cylindrical body and an enlarged, radially extending annular piston head to attach the guide portion, the piston head including an opening which is smaller than an opening extending through the body, and an outer sleeve to at least abut an inner surface of the containing jacket, wherein the guide portion and the tubular containing jacket are configured to have an annular opening located between the inwardly orientated return lip of the guide portion and a portion of the tubular guide portion, wherein the assembly damps oscillation between the adapter and the containing jacket.

2. A seat support assembly as claimed in claim 1 wherein, the adapter has the piston received at least partially within the containing jacket and associated with the tubular guide portion to be at least partially received with the seat stand, the piston head at least abutting an inner surface of the containing jacket to guide movement of the piston relative to the containing jacket.

3. A seat support assembly as claimed in claim 1, wherein the tubular guide portion includes a base portion adapted to be at least partially received by a seat stand, the resilient separator abutting a portion of the base portion and the sealing closure.

4. A seat support assembly as claimed in claim 3 wherein the piston head is received at least partially within the containing jacket and associated with the tubular guide portion, the piston head mounting the outer sleeve to abut at least one interior wall of containing jacket and slide therein.

5. A seat support assembly as claimed in claim 1 wherein the containing jacket is cylindrical and hollow.

6. A seat support assembly as claimed in claim 1 wherein the return lip extends radially inwardly towards a longitudinal midline of the containing jacket leaving an opening defined between the different portions of the return lip.

7. A seat support assembly as claimed in claim 1 wherein the sealing closure corresponds in shape to an end of the containing jacket to which it is releasably attached.

8. A seat support assembly as claimed in claim 1 wherein the guide portion is cylindrical and hollow, defining a cylindrical cavity within to at least partially receive the resilient separator.

9. A seat support assembly as claimed in claim 1 wherein the guide portion has a closed end and an open end, the open end has an annular end surface with a location seat to mount the open end of the guide portion within the containing jacket.

10. A seat support assembly as claimed in claim 9 wherein, the location seat is or includes a rebate provided circumferentially into an external cylindrical surface of the guide portion.

11. A seat support assembly as claimed in claim 9 wherein a shaped rebate is formed adjacent the annular end surface to mount the adaptor or head.

12. A seat support assembly as claimed in claim 11 wherein the shaped rebate includes a circumferential land substantially perpendicular to a longitudinal axis of the guide portion.

13. A seat support assembly as claimed in claim 1 wherein the guide portion is maintained in location within the containing jacket by the adapter.

14. A seat support assembly as claimed in claim 1 wherein the resilient separator is a spring to bias the containing jacket and the guide portion into an extended condition.

15. A seat support assembly as claimed in claim 1 wherein the outer sleeve is cylindrical and abuts an inner surface of the containing jacket.

16. A seat support assembly as claimed in claim 15 wherein the outer sleeve is fixed relative to the containing jacket once the assembly is assembled and the piston head reciprocates relative to the outer sleeve.

17. A seat support assembly as claimed in claim 1 wherein the head includes a radially, outwardly extending flange at a forward end of the head.

18. A seat support assembly as claimed in claim 1 wherein the head includes a radially inwardly extending flange at the forward end of the head to abut the guide portion.

19. A seat support assembly as claimed in claim 1 wherein the piston head is located radially within the outer sleeve with the outwardly extending flange at the forward end of the piston head abutting an end edge of the outer sleeve to prevent movement of the piston head further towards the rear of the containing jacket.

* * * * *